United States Patent
Cornell et al.

(10) Patent No.: US 11,478,078 B1
(45) Date of Patent: Oct. 25, 2022

(54) POWERED CAROUSEL SHELF SYSTEM FOR CABINETS

(71) Applicant: Richard D. Cornell, Knoxville, TN (US)

(72) Inventors: Richard D. Cornell, Knoxville, TN (US); Benjamin D. Nibali, Maryville, TN (US)

(*) Notice: Subject to any disclaimer, the term of this patent is extended or adjusted under 35 U.S.C. 154(b) by 0 days.

(21) Appl. No.: 17/710,010

(22) Filed: Mar. 31, 2022

Related U.S. Application Data

(60) Provisional application No. 63/188,768, filed on May 14, 2021.

(51) Int. Cl.
*A47B 49/00* (2006.01)

(52) U.S. Cl.
CPC .......... *A47B 49/002* (2013.01); *A47B 49/008* (2013.01)

(58) Field of Classification Search
CPC ... A47B 49/002; A47B 49/008; A47B 63/067; A47B 63/06
USPC ...... 312/277, 97.1, 125, 135, 266–268, 134, 312/97; 211/1.55–1.57, 1.51–1.53, 121, 211/122; 198/469.1, 703, 710, 706, 798, 198/799–802; 414/331.04, 248, 251
See application file for complete search history.

(56) References Cited

U.S. PATENT DOCUMENTS

| | | | |
|---|---|---|---|
| 1,972,258 A * | 9/1934 | Boyle | E04H 6/282 198/794 |
| 2,603,547 A * | 7/1952 | Zook | A47B 63/067 211/121 |
| 3,178,247 A * | 4/1965 | Wittrup | A47B 63/067 312/268 |
| 3,578,832 A * | 5/1971 | Toms | A47B 63/067 312/91 |
| 4,643,495 A | 2/1987 | Pepping | |
| 4,779,938 A * | 10/1988 | Johnston | A47F 3/08 312/134 |
| 4,915,461 A | 4/1990 | Kingsborough | |
| 5,234,306 A * | 8/1993 | Yamashita | B65H 39/02 414/789.9 |
| 5,431,493 A * | 7/1995 | Larson | A47B 49/00 312/307 |
| 6,119,880 A | 9/2000 | Dueck | |

(Continued)

FOREIGN PATENT DOCUMENTS

| | | | |
|---|---|---|---|
| CN | 108514241 | * | 9/2018 |
| DE | 202014103712 | * | 10/2014 |

(Continued)

*Primary Examiner* — Janet M Wilkens
(74) *Attorney, Agent, or Firm* — Pitts & Lake, P.C.

(57) ABSTRACT

A revolving shelf system including side plates to be mounted on opposite side walls of a cabinet, a drive track on a face of each of the side plates, a plurality of guide tracks on the faces of the side plates, a plurality of shelves, a drive pin arranged on each end of the shelves, and configured to extend respectively into each of the drive tracks, a plurality of guide pins arranged on each end of the shelves, and configured to extend respectively into corresponding ones of the guide tracks, a drive chain arranged in each of the side plates to respectively drive the drive pins, and a motor to transmit driving power to the drive chains, wherein the shelves move with a rotation of the drive chains, and the drive and guide pins remain extended into the respective drive and guide pin tracks at any position of the shelves.

17 Claims, 9 Drawing Sheets

(56) References Cited

U.S. PATENT DOCUMENTS

| | | | | |
|---|---|---|---|---|
| 6,854,815 B1 * | 2/2005 | Smith | .................. | A47B 49/008 |
| | | | | 211/121 |
| 7,811,042 B1 * | 10/2010 | Menendez | ............. | B65G 1/127 |
| | | | | 211/1.55 |
| 2006/0226092 A1 * | 10/2006 | Krohn | ....................... | A47F 3/11 |
| | | | | 211/121 |
| 2006/0238084 A1 * | 10/2006 | Golani | .................... | F25D 25/04 |
| | | | | 312/268 |
| 2008/0092582 A1 | 4/2008 | Doran | | |

FOREIGN PATENT DOCUMENTS

| | | | |
|---|---|---|---|
| FR | 2587005 | * | 3/1987 |
| KR | 20160011334 | * | 2/2016 |
| WO | WO2017048213 | | 3/2017 |

* cited by examiner

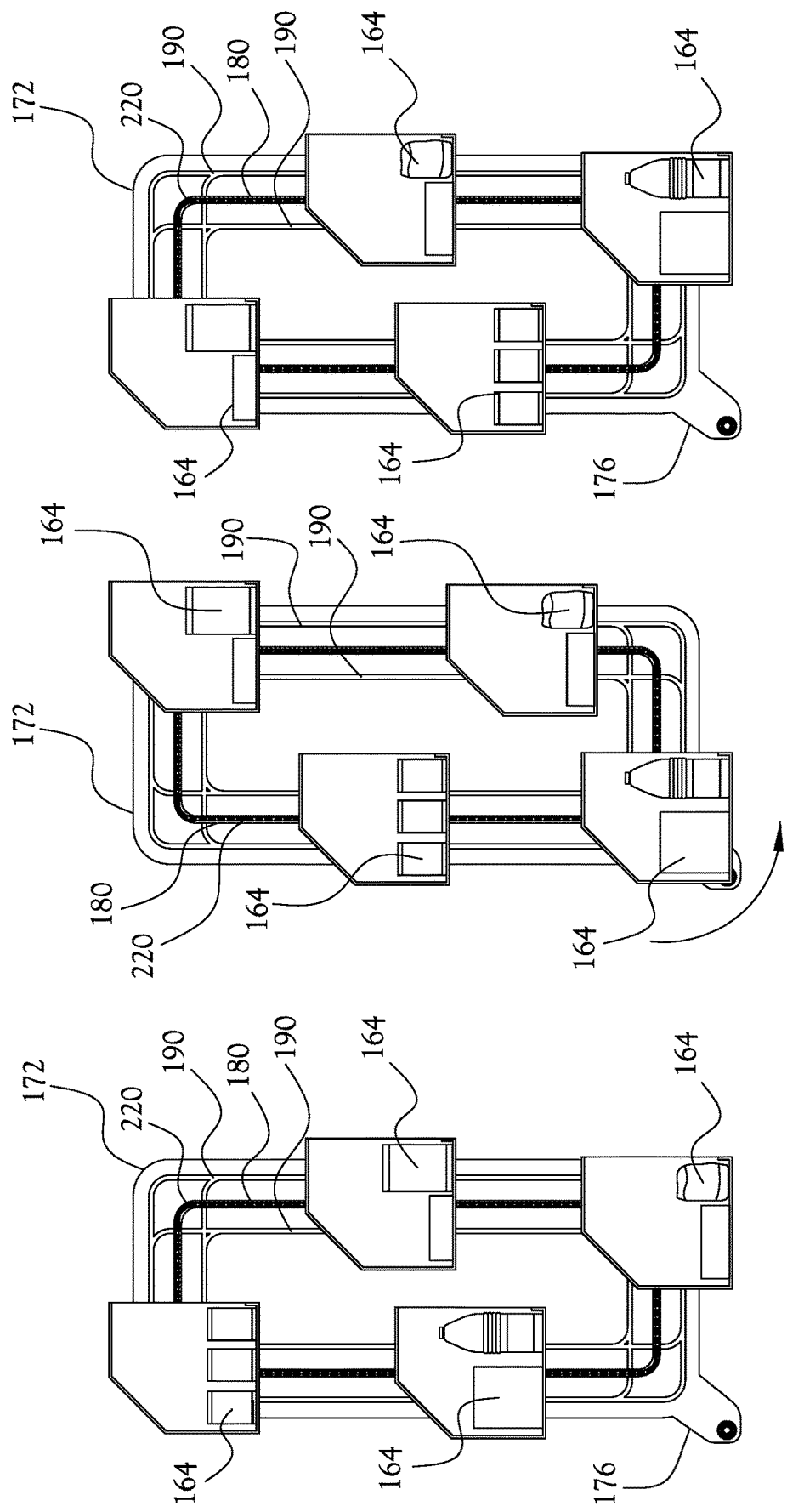

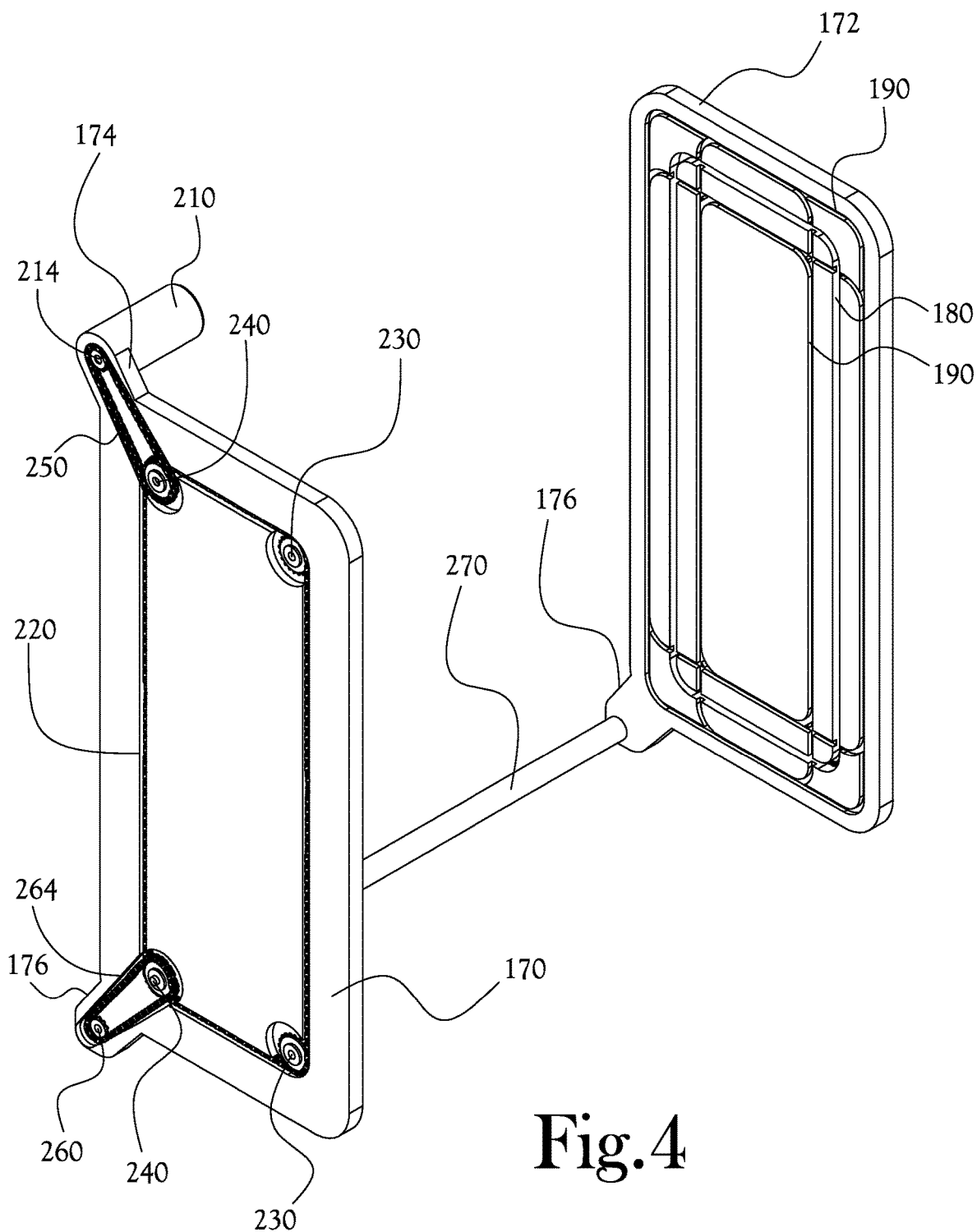

US 11,478,078 B1

POWERED CAROUSEL SHELF SYSTEM FOR CABINETS

CROSS-REFERENCE TO RELATED APPLICATIONS

This application claims the benefit of U.S. Provisional Patent Application Ser. No. 63/188,768, filed on May 14, 2021, which is incorporated herein in its entirety by reference.

FIELD OF INVENTION

The present general inventive concept relates to movable cabinet shelves, and, more particularly, to a powered carousel system that controls the positioning of revolving cabinet shelves.

BACKGROUND

Cabinetry is one of the most important features of a home, and often commercial or industrial spaces, because of the unique combination of aesthetic and utilitarian features. Cabinets often provide a central decorative theme in residential kitchens, and can provide a host of different storage options such as drawers, shelves, racks, and so on. However, wall mounted cabinets, which are found in almost every kitchen, can present challenges to users who have trouble reaching some of the shelves inside at all, much less the items that may be on a back area of the shelf. People of shorter heights may need to sometimes stand on items such as ladders, chairs, etc., to access those shelves, which provides ample opportunity for serious falls injuries to that person. Such a situation may be even more problematic for persons living with various disabilities that decrease their reach even further. Therefore, it would be desirable to have movable shelves in the wall cabinets that could be brought forward and lowered so that users could more easily and conveniently retrieve items from the shelves, and/or store items on the shelves.

BRIEF SUMMARY

According to various example embodiments of the present general inventive concept, a powered revolving shelf system is provided that allows a user to bring a desired shelf to the forward section near the bottom of the cabinet with an easy manipulation of a system control interface. For example, a plurality of buttons could be arranged near the front of the cabinet that allow a user to revolve all of the shelves inside about a point proximate the center of the cabinet space until the desired shelf is in the most accessible position.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a revolving shelf system for a cabinet, the system including first and second side plates configured to be mounted on opposite side walls of a cabinet, a drive track configured on a face of each of the first and second side plates, a plurality of guide tracks configured on the face of each of the first and second side plates, a plurality of shelf members each having first and second ends, a drive pin arranged on each of the first and second ends of the shelf members, and configured to extend respectively into each of the drive tracks, a plurality of guide pins arranged on each of the first and second ends of the shelf members, and configured to extend respectively into corresponding ones of the guide tracks, a drive chain arranged in each of the first and second side plates to respectively drive the drive pins, and a motor configured to transmit a driving power to each of the drive chains, wherein the shelf members are configured to move with a rotation motion of the drive chains, and the drive pins and guide pins remain extended into the respective drive pin tracks and guide pin tracks at any position of the shelf members.

The foregoing and/or other aspects and advantages of the present general inventive concept may also be achieved by providing a revolving shelf system for a cabinet, the system including first and second side plates configured to be mounted on opposite side walls of a cabinet, a drive track configured on a face of each of the first and second side plates, a plurality of guide tracks configured on the face of each of the first and second side plates, a plurality of first and second mounting plates configured to be mounted on respective first and second ends of a plurality of shelf members, a drive pin arranged on each of the first and second mounting plates, and configured to extend respectively into each of the drive tracks, a plurality of guide pins arranged on each of the first and second mounting plates, and configured to extend respectively into corresponding ones of the guide tracks, a drive chain arranged in each of the first and second side plates to respectively drive the drive pins; and a motor configured to transmit a driving power to each of the drive chains, wherein the system is configured as a kit to be installed in a cabinet with the mounting plates connected to separately provided shelf members cut to an operable length; and wherein the shelf members with the mounting plates attached thereto are configured to move with a rotation motion of the drive chains, the drive pins and guide pins remaining extended into the respective drive pin tracks and guide pin tracks at any position of the shelf members.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIGS. 3A-C illustrate cross-sections of the revolving shelf system of FIG. 1 with the shelves moved to different positions;

FIG. 4 illustrates a perspective view of portions of the revolving shelf system of FIG. 1 in which rotation power is transmitted from one side plate to the other according to this example embodiment of the present general inventive concept;

DETAILED DESCRIPTION

Figure 1:
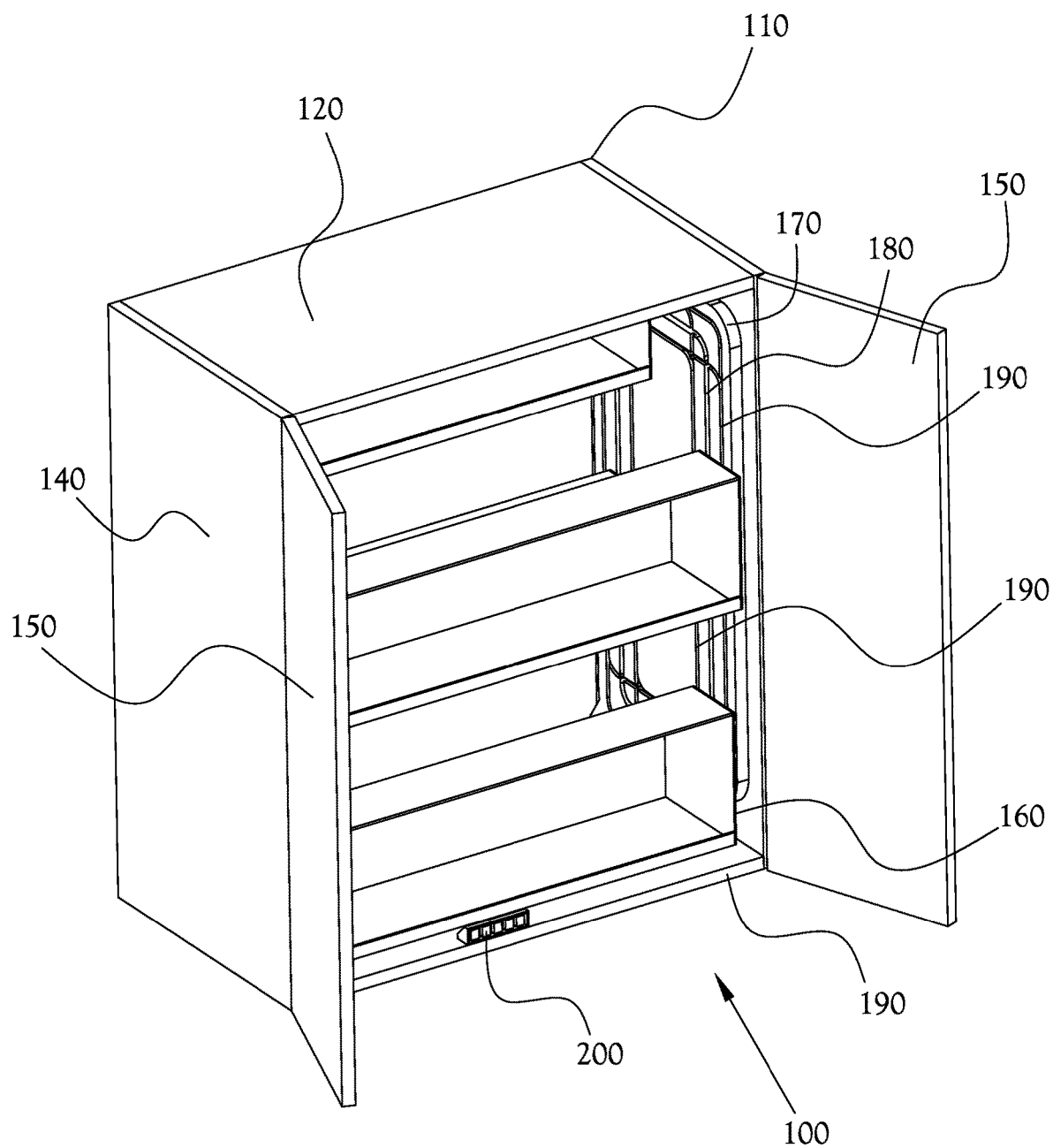
FIG. 1 illustrates a perspective view of a revolving shelf system installed in a cabinet according to an example embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, a powered revolving shelf system is provided that allows a user to bring a desired shelf to the forward section near the bottom of the cabinet with an easy manipulation of a system control interface. For example, a plurality of buttons could be arranged near the front of the cabinet that allow a user to revolve all of the shelves inside about a point proximate the center of the cabinet space until the desired shelf is in the most accessible position. The provided system for moving the shelves about tracks provided at sides of the cabinet may be referred to herein as a revolving, or carousel, shelf system. Various example embodiments allow the shelves to be moved forward or backward along the tracks, moving the shelves in the back to a forward position, and vice versa, to allow a user to conveniently access the desired shelf. The shelves of these various example embodiments are secured by those tracks so as not to rotate, rock, or otherwise deviate from the generally horizontal plane of the shelves, even during movement about the tracks. While most of the example embodiments described herein are configured in wall mounted cabinets, such as those above the kitchen counter, various example embodiments of the present general inventive concept may be provided in lower cabinets, pantries, etc., as well.

FIG. 1 illustrates a perspective view of a revolving shelf system installed in a cabinet according to an example embodiment of the present general inventive concept. The shelf system 100 of this example embodiment is shown as installed in a cabinet 110 having a top panel 120, a bottom panel 130, two side walls 140, and two cabinet doors 150. The shelf members or shelves 160 extend between first and second side plates 170,172 that are mounted on the inner surfaces of the side walls 140, and are arranged to move about the inner cabinet space according to the shape of a drive track 180, and a plurality of guide tracks 190, formed on the facing surfaces of the first and second side plates 170,172. Those facing surfaces may be referred to herein simply as the "faces" of the first and second side plates 170,172. As will be described in more detail herein, the drive tracks 180 and guide tracks 190 provide rotational movement to the shelves 160 that generally mimics the inside of the cabinet 110 space. As such, a complete circuit around the drive tracks 180 and guide tracks 190 is taller than it is wide, and generally rectangular except for the rounded corners that provide smooth movement about the circuit. A user interface, which in this example embodiment is a plurality of buttons 200, are provided to allow a user to advance the shelves 160 forward or backward in the revolving or carousel movement, and in some example embodiments individual buttons may be configured to control the system so as to bring a particular shelf 160 to the front and low position illustrated by the lowest and most forward shelf 160 illustrated in FIG. 1. The buttons 200 may be provided near a front edge of the bottom panel 130 of the cabinet 110, just behind the doors 150, to provide easy access to a user, as well as to prevent interference with any shelves 160 moving by. In various example embodiments, such as that illustrated in FIG. 1, the controls 200 may include a housing that is angled on a back surface to provide further clearance for any shelves 160 passing overhead.

Figure 2:
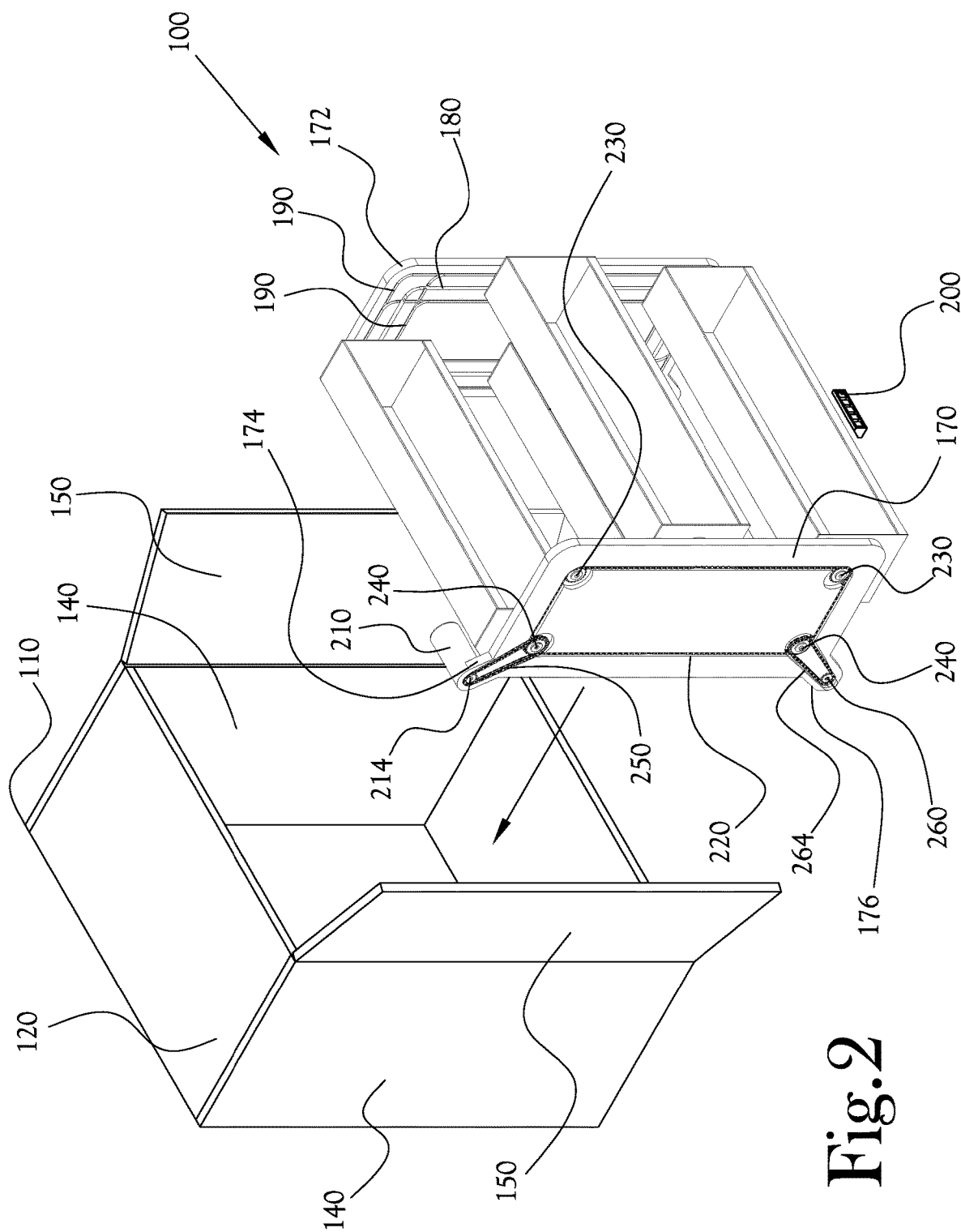
FIG. 2 illustrates a perspective view of the assembled revolving shelf system of FIG. 1 outside of the cabinet.

FIG. 2 illustrates a perspective view of the assembled revolving shelf system 100 of FIG. 1 outside of the cabinet 110. As illustrated, the first side plate 170 is provided with a drive chain 220 that is supported by sprockets 230,240 so as to have the same shape as the drive track 180 formed on the face of the first side plate 170. The second side plate 172 is also provided with such an arrangement, but is not shown in FIGS. 1-2. However, the first side plate 170 is also configured with a motor 210 that is connected to a motor tab 174 extending from the top rear corner of the first side plate, and configured to rotate a motor sprocket 214 to drive a transmission chain 250, which transmits rotational power to a drive sprocket 240 to drive the drive chain 220. The drive sprocket 240 may be a double sprocket geared for both the drive chain 220 and the transmission chain 250. Thus, rotational power is transmitted from the motor 210 to the drive chain 220, driving the shelves 160 about the carousel arrangement. In various example embodiments of the present general inventive concept the motor 210 may be configured to selectively drive the shelves 160 in each rotational direction. In various example embodiments such a motor may be provided to each of the first and second side plates 170,172, but in the example embodiment illustrated in FIGS. 1-2 only the one motor 210 is provided. Another drive sprocket 240 is arranged at the lower rear portion of the drive chain 220 to transmit rotational power from the drive chain 220 through a transmission chain 264 to a sprocket 260 that rotates a drive shaft 270, which illustrated more clearly in FIG. 4, in order to provide rotational power to the drive chain 220 in the second side plate 172. In this example embodiment, the motor 210 is connected at a distal end of a motor tab 174, and the drive shaft 270 is connected at a distal end of a drive shaft tab 176, to offset the motor 210 and drive shaft 270 back away from the shelves' 160 area of movement, so as to avoid interference. Thus, as shown in FIG. 2, the drive chain 220 is supported by two forward support sprockets 230, is driven by the motor 210 via the top oriented drive sprocket 240, and drives the lower oriented drive sprocket 240 to rotate the drive shaft 270, the action of which drives the drive chain 220 of the second side plate 172. Various example embodiments may have a host of differently configured and/or located components without departing from the scope of the present general inventive concept.

FIGS. 3A-C illustrate cross-sections of the revolving shelf system 100 of FIG. 1 with the shelves 160 moved to different positions. These shelves 160 are illustrated with various types of goods that may be stored in a cabinet, identified generically as storage items 164, to show some differentiation between the individual shelves 160 in these drawings. As illustrated in FIG. 3A, one of the shelves 160 is located in the most easily accessed position, which in this case is the lowest and forwardmost position on the drive track 180. However, the user wants to access items located on the next shelf back, so the user controls the system 100 to rotate (counterclockwise in these drawings) the shelves 160, as shown in FIG. 3B, until the desired shelf 160 is in the desired easy access position, as illustrated in FIG. 3C. Thus, rather than having to climb and/or strain to rummage around the back area of a high shelf, the user is able to control the revolving shelf system 100 to bring the desired shelf 160 to the user. The shelves 160 are fixed on the drive tracks 180 and guide tracks 190 so as to maintain a set distance from one another, and to maintain at least some gap between the shelves 160 and the top panel 120, bottom panel 130, back panel, and cabinet doors 150, so that no contact is made between the shelves 160 and cabinetry during the revolving movement. In FIGS. 3A-C the drive chain 220, which drives the movement of the shelves 160, is visible through the drive track 180.

FIG. 4 illustrates a perspective view of portions of the revolving shelf system 100 of FIG. 1 in which rotation power is transmitted from the first side 170 plate to the second side plate 172 according to this example embodiment of the present general inventive concept. As previously described, the motor 210 rotates the motor sprocket 214, driving the transmission chain 250, which rotates the upper drive sprocket 240 of the first side plate 170 to drive the drive chain 220. The movement of the drive chain 220 rotates the lower drive sprocket 240 to drive the transmission chain 264 that rotates the sprocket 260 connected to the drive shaft 270 so as to rotate the drive shaft 270. The back face of the second side plate 172 contains the same components, in mirror image, as those arranged in the first side plate 170, except for the motor 210, motor tab 174, transmission chain 250 and upper drive sprocket 240 (which is replaced by a support sprocket 230 in the second side plate 172), and thus the rotation of the drive shaft 270 rotates a sprocket 260 in the second side plate 172 that is coupled to the end of the drive shaft 170 proximate the second side plate 172. This drives a transmission chain 264 in the second side plate 172 to rotate a drive sprocket 240 and drive the drive chain 220 of the second side plate 172 to as to rotate synchronously with the drive chain 220 of the first side plate 170. In this manner the respective ends of the shelves 160 are always at the same point along the two drive tracks 180 to provide smooth movement of the shelves 160. It is noted that the first and second side plates 170,172 are configured so that their respective drive tracks 180 and guide tracks 190 are arranged in mirror image to provide this smooth and synchronized movement of the shelves 160. As illustrated in FIG. 4, the side plates 170,172 may be arranged essentially as housings for the various components contained therein, which aids both in preventing malfunction and improves the visual aesthetics of the system. For example, with such an arrangement as shown in this example embodiment, all of the drive and support cogs are completely hidden, and it would be nearly impossible to see the drive chains through the drive tracks when the system is installed.

Figure 5A:
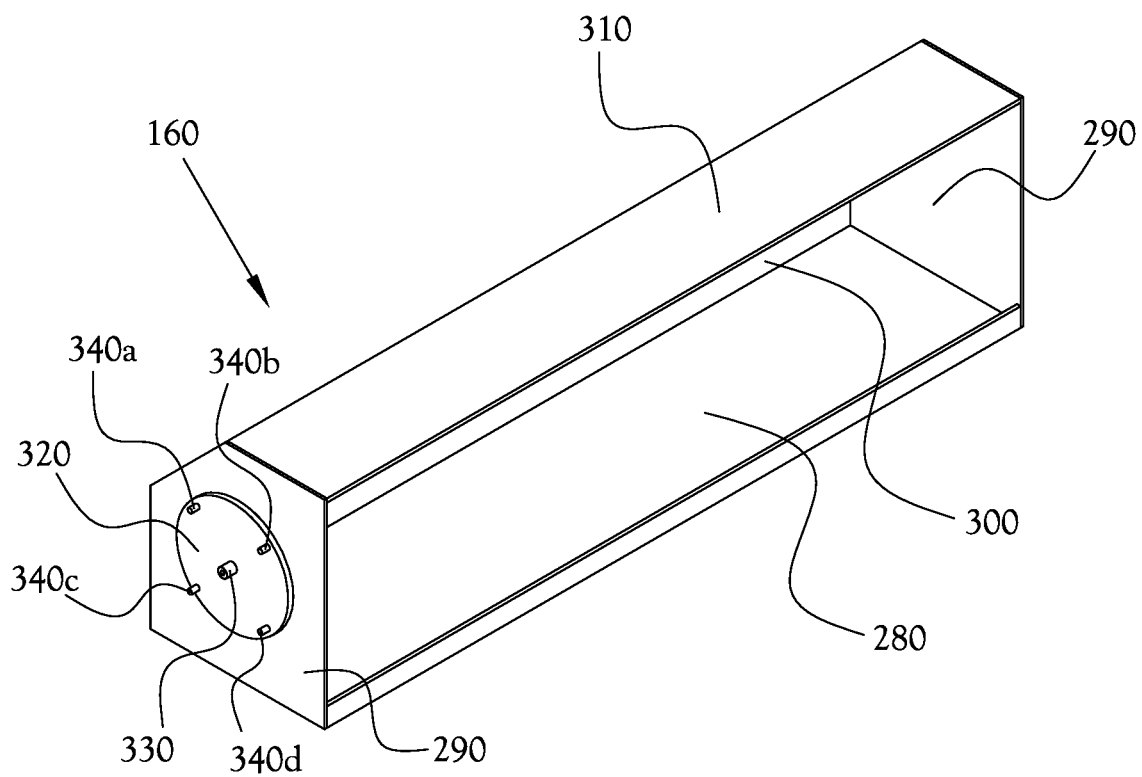
FIGS. 5A-B illustrate perspective views of a shelf member of the system illustrated in FIG. 1.
Figure 5B:
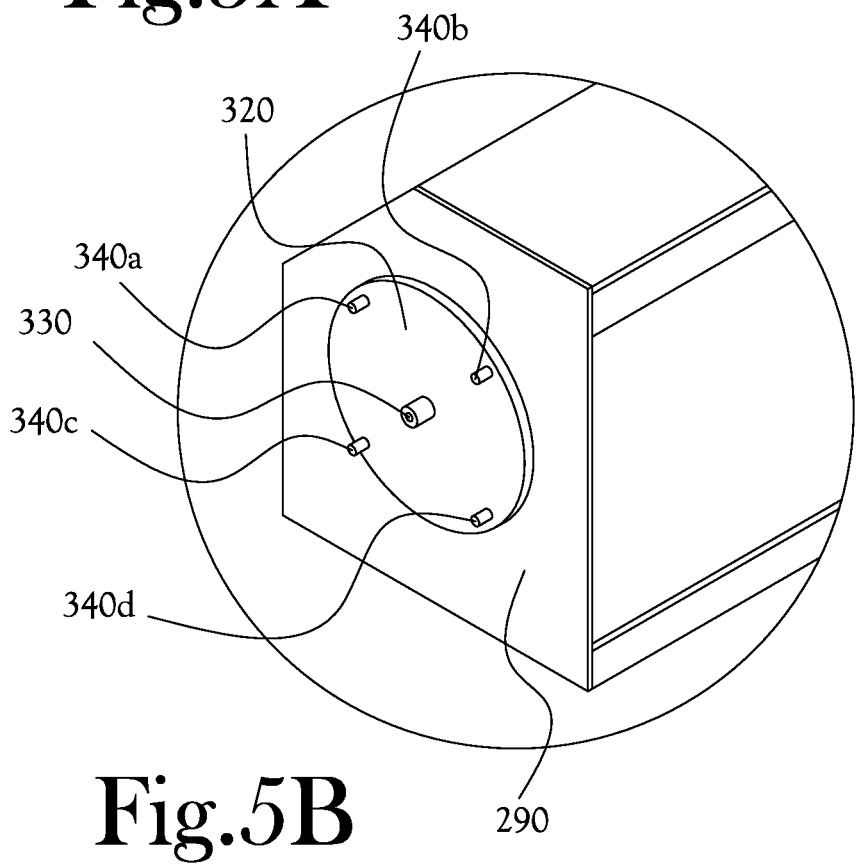

FIGS. 5A-B illustrate perspective views of a shelf member of the system illustrated in FIG. 1. As illustrated, the shelf 160 is arranged with a shelf bottom 280, two opposing shelf end walls 290, a shelf back wall 300, and a shelf top panel 310. Such an enclosure helps items to stay on the shelves 160 during movement, but various example embodiments may be provided with a host of different configurations and features without departing from the scope of the present general inventive concept. The shelf of this example embodiment also has a lip extending up from a front edge of the shelf bottom 280 to aid in preventing items from sliding out of the front of the shelf 160. A mounting plate 320 is arranged on each end of the shelf 160, and a drive pin 330 is centrally located on the mounting plate 320. A plurality of guide pins 340 are arranged about the drive pin 330 so as to extend into the guide tracks 190 of the side plates 170,172 when the drive pin 330 is extended into the drive tracks 180. These guide pins 340 are kept aligned in the same orientation by the guide tracks 190 at all points of movement about the revolving rotation of the shelves 160, thus preventing any rotational movement about the drive pin 330. In FIGS. 5A-B, the guide pins 340 are further identified by letters to aid in the discussion of FIGS. 7A-D later in this description. The mounting plates 320 at each end of the shelf 160 include a top rear guide pin 340a, a top front guide pin 340b, a bottom rear guide pin 340c, and a bottom front guide pin 340d. It is noted that various example embodiments may provide other quantities of guide pins, and in different arrangements, without departing from the scope of the present general inventive concept. Various example embodiments may provide shelves with the drive pins 330 and guide pins 340 mounted directly on the shelf end walls 290. However, by providing mounting plates 320 including the drive pins 330 and guide pins 340, various example embodiments of the revolving shelf system can be provided in kit form without the actual shelves, so that a user can configure the shelves to the user's own preferences, and then attach the mounting plates 320 to the ends of those shelves. Such a kit system may also be versatile in that it would fit most any width of cabinet space, since the components do not depend upon any certain length of the shelving. In other example embodiments, shelf members may be provided that are configured to be cut down to a desired length before attaching the mounting plates 320 thereto.

Figure 6:
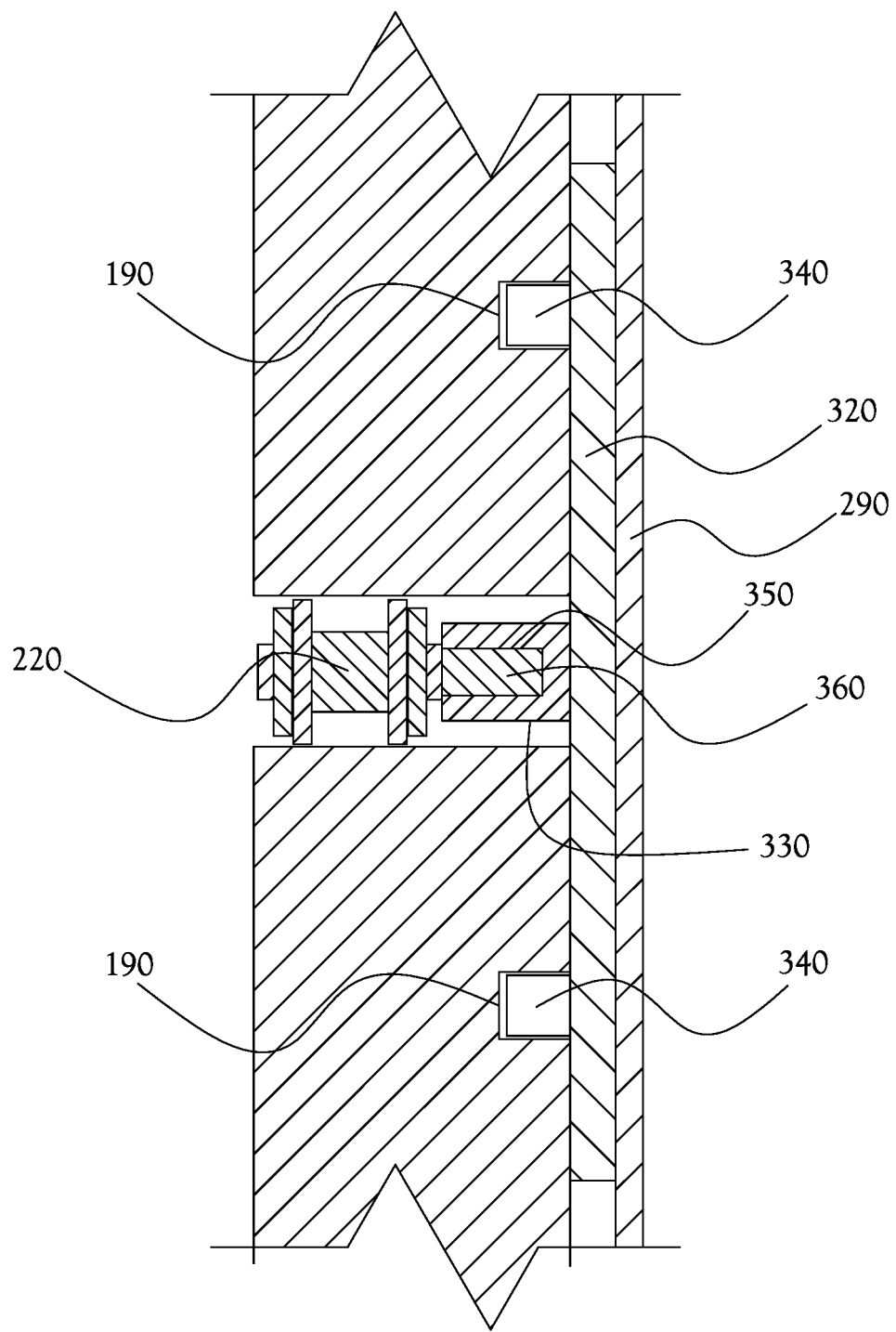
FIG. 6 illustrates a cross section of the drive/guide pins and tracks arrangement according to an example embodiment of the present general inventive concept.

FIG. 6 illustrates a cross section of the drive/guide pins and tracks arrangement according to an example embodiment of the present general inventive concept. The cross section of FIG. 6 illustrates the position of a shelf 160 midway across the top portion of the various tracks, i.e., the horizontal portion, on each of the side plates 170,172. As illustrated, the guide pins 340 move along in the respective grooves forming the guide tracks 190 into which the guide pins 340 are extended, and the drive pin 330 moves along in the recess forming the drive track 180 in which the drive pin 330 is extended. Deeper in the drive track 180 the drive chain 220 is configured so as to be coupled to the drive pins 330 of the system 100. In this example embodiment, the drive pin 330 is provided with a central guide pin recess 350 that is configured to receive a chain link boss 360 that is coupled to one of the links of the drive chain 220. Thus, the rotation of the drive chain 220 forces the rotation of the shelf 160 to which the drive pin 330 is connected, and the movement of the guide pins 340 are limited by the drive tracks 190 such that there is no rotational movement of the shelf about the drive pin 330. As illustrated in FIG. 6, the guide tracks 190 are not as deep as the drive track 180, and the guide pins 340 are not as long as the drive pins 330. As such, at points at which the guide tracks 190 intersect with the drive track 190 on each of the side plates 170,172, the guide pins 340 cannot protrude far enough into the drive track 180 to have any contact with the drive chain 220. Various example embodiments may have a host of differently configured and/or located components without departing from the scope of the present general inventive concept. For example, although the example embodiments discussed herein describe a chain as the drive member(s) for the system, in various example embodiments one or more of those drive members could be one of a host of other flexibly driving elements such as, for example, a timing belt. Timing belts, such as a flexible rubber/fabric belt with teeth molded onto one or both sides, are common and are often used in situations in which a chain could also be used. In various example embodiments using a timing belt as a driving element, the drive pins described herein may be coupled to the timing belt in a number of ways without departing from the scope of the present general inventive concept.

Figure 7A:
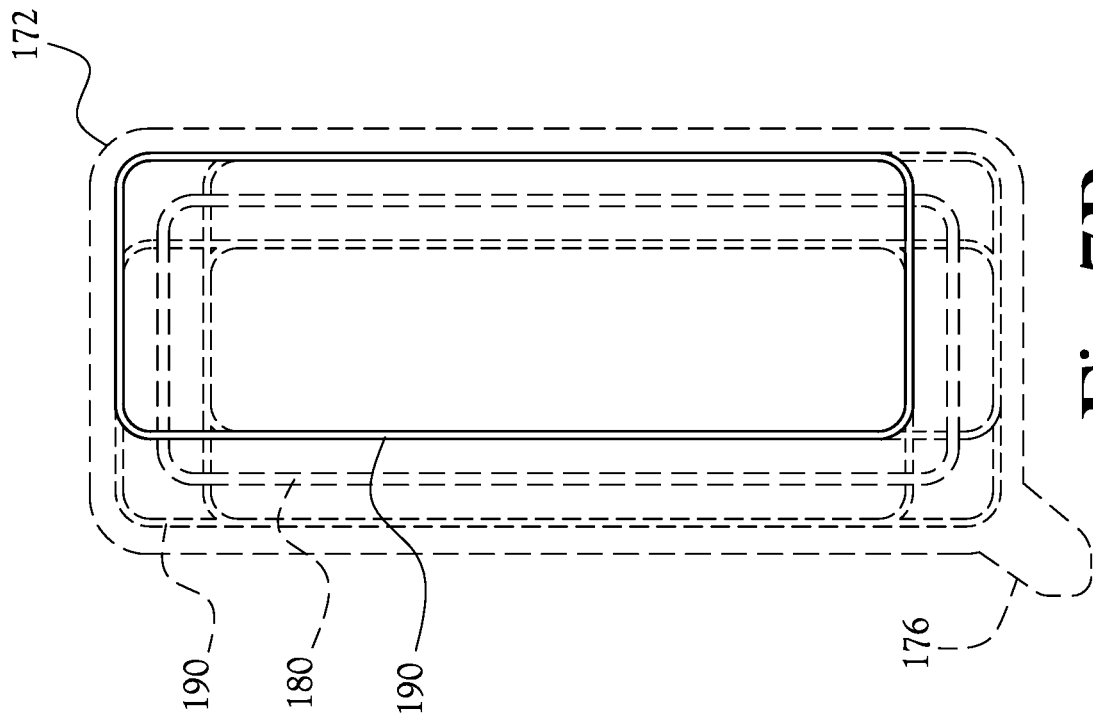
FIGS. 7A-D illustrate the paths of the individual guide pins in the revolving shelf system of this example embodiment of the present general inventive concept.
Figure 7B:
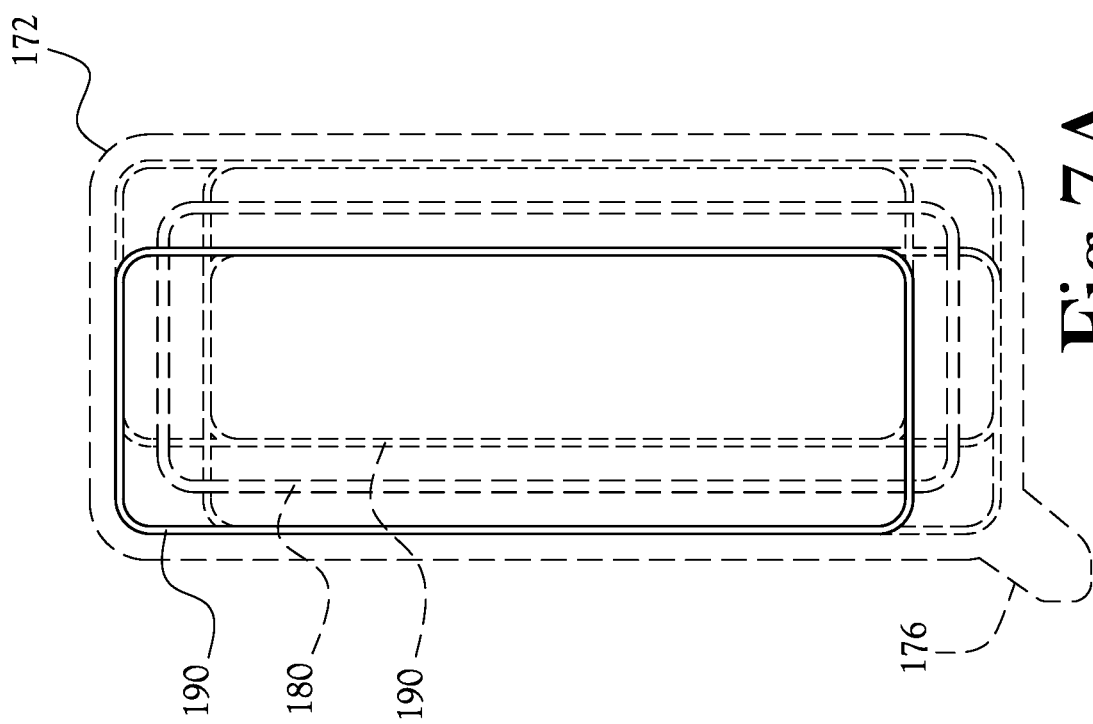
Figure 7C:
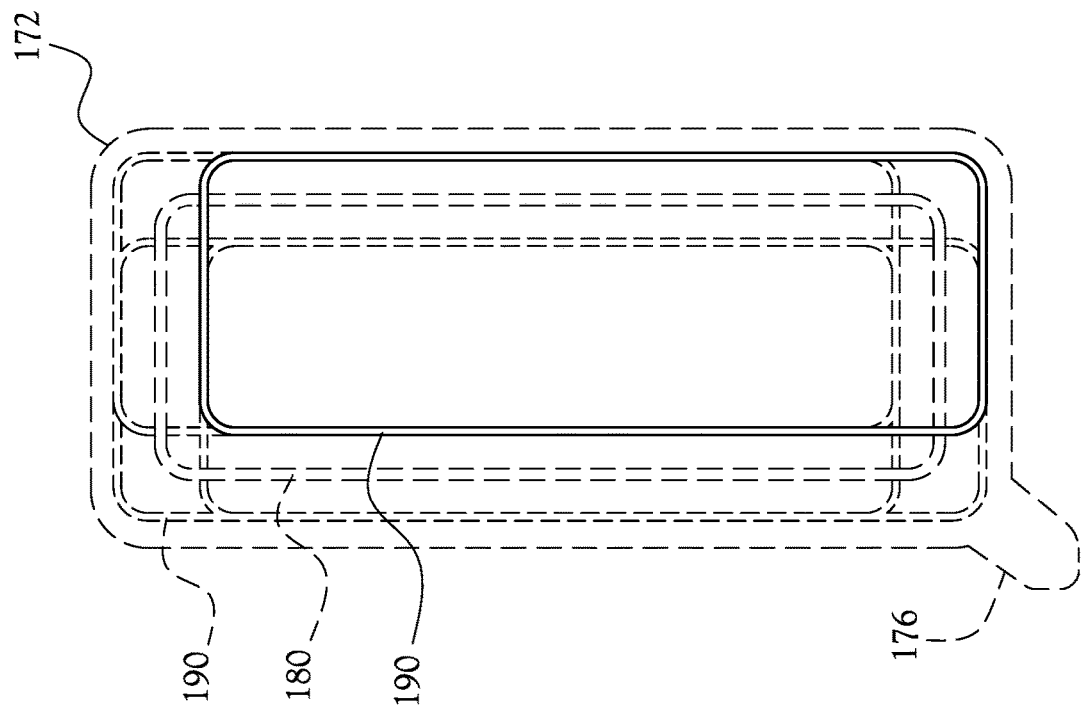
Figure 7D:
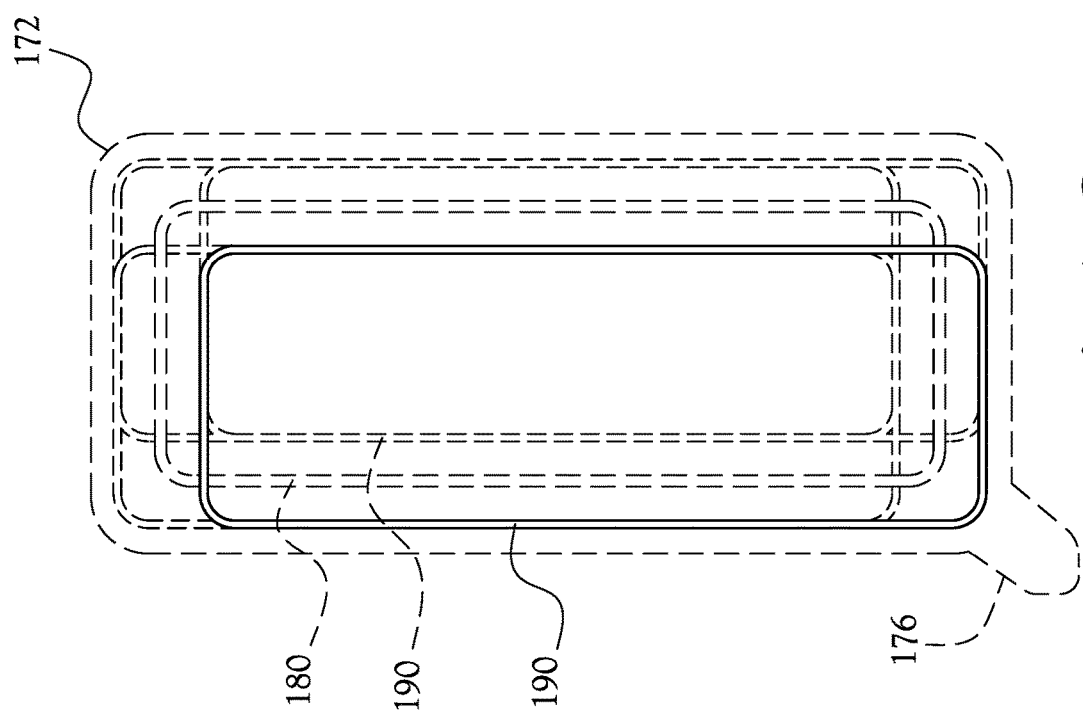

FIGS. 7A-D illustrate the paths of the individual guide pins 340 in the revolving shelf system 100 of this example embodiment of the present general inventive concept. In FIGS. 7A-D, the drive track 180 and guide tracks 190 configured on the second side plate 172 are illustrated. However, each of these drawings show the revolving path taken by a certain one of the guide pins 340, and the remaining portions of the structures are shown in dotted lines to emphasize the illustrated guide pin 340 paths along the guide tracks 190. The dark, unbroken lines of FIG. 7A are the loop traveled by guide pin 340a as the shelf 160 moves about the carousel circuit. FIG. 7B similarly shows the loop traveled by guide pin 340b, FIG. 7C shows the loop traveled by guide pin 340c, and FIG. 7D shows the loop traveled by guide pin 340d. Thus, while the guide tracks 190 are laid out with several overlapping sections, as well as multiple intersections with the drive track 180, each loop traveled by the respective guide pins 340 is the same loop that is formed by the drive pin 330 movement through the drive track 180. As such, no matter at what position along the circuit of movement the shelf 160 is located, the orientation of the drive pin 330 and guide pins 340 shown in FIGS. 5A-B is maintained. For example, the front guide pins 340b and 340d will always be in vertical alignment, the rear guide pins 340a and 340 c will always be in vertical alignment, the top guide pins 340a and 340b will always be in horizontal alignment, and the bottom guide pins 340c and 340d will always be in horizontal alignment, at any and all shelf positions in the system. All of the guide pins 340 and the drive pin 330 on the respective side plates 170,172 travel the same looped path. Further, at no point are any of the guide pins 340 or drive pins 330 not extending into the respective first and second side plates 170,172, which aids in preventing malfunction by misalignment of pins and tracks.

Figure 8:
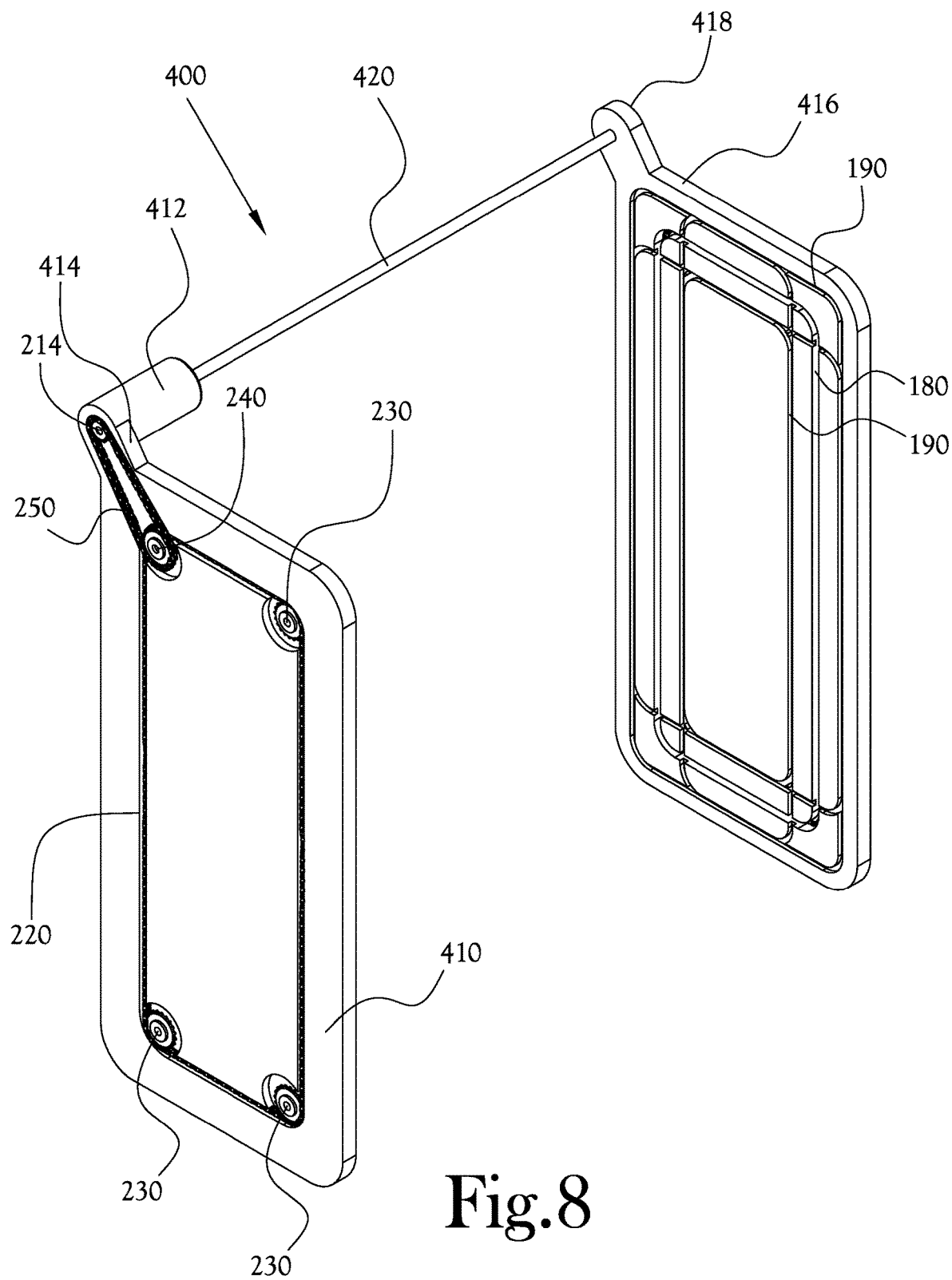
FIG. 8 illustrates a perspective view of portions of a revolving shelf system in which rotation power is transmitted from one side plate to the other according to another example embodiment of the present general inventive concept.

FIG. 8 illustrates a perspective view of portions of a revolving shelf system in which rotation power is transmitted from one side plate to the other according to another example embodiment of the present general inventive concept. In this example embodiment, the revolving shelf system 400 has many of the same components as the shelf system 100 illustrated in FIGS. 1-2, with much the same arrangement. However, rather than having the drive shaft 270 that is separated from the motor 210 in the shelf system 100, in this example embodiment a motor 412 connected to a motor tab 414 extending from a first side plate 410 is configured to simultaneously rotate the motor sprocket 214 driving the transmission chain 250 of the first side plate 410, and rotate a drive shaft 420 that extends to a drive shaft tab 418 extending from the rear upper corner of the second side plate 416 to rotate a sprocket and transmission chain arrangement in the second side plate 416 synchronously with that in the first side plate 410. Such an arrangement reduces the number of some of the components included in the previously described system, but employs a motor that provides rotational drive from each end. Although the example embodiments illustrated herein show a motor connected to the first or left side plate, it is understood that such a motor could be connected to the second or right side plate according to various example embodiments.

The user interface or controls of various example embodiments may provide a directional switch or buttons, either along with or instead of the shelf dedicated buttons described herein, to cause rotation of the shelves until the user sees the shelf that the user desires to access. Various other example embodiments may provide a host of other different control configurations, such as a single rocker switch, a screen with a graphical user interface (GUI), voice activated controls, etc., and/or may communicate wirelessly with a smartphone or tablet to control the electrical actuator. In various example embodiments the controls may be located on a forward portion of one of the side walls 140.

Various example embodiments of the present general inventive concept may provide various forms of smart controls for the revolving shelf system, which may provide secondary controls for other cabinetry features. Such an example embodiment may let the operator actuate the powered features provided to one or more individual cabinets via wireless connectivity through an application on an information processing device such as a smartphone, tablet, etc., and/or with a centralized touchscreen interface controlling all of the cabinets. In various example embodiments such power-able features may include actuation of doors and/or drawers, locking of doors and/or drawers, extending/retracting shelving, a powered appliance lift, controlling lighting in the cabinets, etc., or any combination of such features. Such smart control features may be optional in the various example embodiments of the present general inventive concept, and any and all such powered features may also be controlled by a hardwired dedicated interface accessible from, for example, the front side of each cabinet. In example embodiments in which only local (proximate) control of the cabinets may be desired, the cabinets may be connected together via short-range wireless technology such as BLUETOOTH®. Each cabinet may have an individual BLUETOOTH® module, and one of the cabinets (or a separate master device) may act as the BLUETOOTH® hub. This would enable controlling a certain function of several cabinets at the same time. Such a configuration would be useful, for example, for turning the lighting on/off on all cabinets simultaneously, etc. Remote (distant) control of the cabinets may be achieved by adding a master Wi-Fi module to a cabinet (or by adding a separate master device) that also acts as the BLUETOOTH® hub. This "master" device may receive input over the local Wi-Fi network and relay the output to the cabinets via BLUETOOTH® or an equivalent wireless method. The apps on smartphones/tablets may be, for example, Android/iOS apps, open source home automation software like Home Assistant, or the like. The latter may work with a dedicated PC, which could also be used as the Wi-Fi/BLUETOOTH® hub. In such example embodiments as these described above, the two-way data transfer may be established to allow remote monitoring of actuator or lock status, to see if, for example, assisted living residents are using the system.

Various example embodiments of the present general inventive concept may provide convenient reach access and improved usability to upper cabinet space for private residential or assisted living facilities by allowing powered shelf movements to be incorporated into custom upper cabinets. Various example embodiments may also be employed in lower cabinets. In various example embodiments the basic revolving or carousel architecture may include separate left and right drive/guide assemblies, with custom-built shelves, or optional transparent shelves, etc. The shelves are configured to remain vertical during operation, regardless of imbalanced loading, which may be accomplished by a series of tracks at each side wall. Some of those tracks guide pins extending from the ends of the shelf units. When in the corresponding tracks, the pins will not allow the shelf to rotate out of a vertical orientation. The drive motor may be located in the upper rear space of the cabinet, and the motor may drive a chain or other such drive member around inside a track in each side panel. A central mount or drive pin may be located at each end of each shelf to engage a link of the chain. The shelves may be spaced along the chain such that they do not interfere with one another during rotation. The left and right sides of the system may be kept in synchronous motion by using a drive shaft that spans across the rear of the upper or lower cabinet space. In various example embodiments the shelves may be enclosed to assure that a shelf's contents do not interfere with other items or surfaces in the cabinet during motion. A control panel or other such user controls may allow the selection of a particular desired shelf, which could be driven as needed to stop in the lower front position that is most accessible by the user.

Various example embodiments of the present general inventive concept may provide a revolving shelf system for a cabinet, the system including first and second side plates configured to be mounted on opposite side walls of a cabinet, a drive track configured on a face of each of the first and second side plates, a plurality of guide tracks configured on the face of each of the first and second side plates, a plurality of shelf members each having first and second ends, a drive pin arranged on each of the first and second ends of the shelf members, and configured to extend respectively into each of the drive tracks, a plurality of guide pins arranged on each of the first and second ends of the shelf members, and configured to extend respectively into corresponding ones of the guide tracks, a drive chain arranged in each of the first and second side plates to respectively drive the drive pins, and a motor configured to transmit a driving power to each of the drive chains, wherein the shelf members are configured to move with a rotation motion of the drive chains, and the drive pins and guide pins remain extended into the respective drive pin tracks and guide pin tracks at any position of the shelf members. The shelf members may be configured to remain in a horizontal position during movement of the drive chains. The guide pins may maintain a constant orientation about the corresponding drive pin at each end of the shelf members during movement of the drive chains. The guide tracks may be configured such that each guide pin has a same rotational path as the proximate drive pin. The guide tracks may be configured such that at least a portion of a rotational path of each of the guide pins overlap with a rotational path of one or more of the other guide pins. The drive tracks and the guide tracks may be configured as grooves that extend back from the respective faces of the first and second side plates. The drive tracks may be configured to be deeper than the guide tracks. The system may further include a mounting plate provided at each of the first and second ends of the shelf members, and the drive pins and guide pins may extend from the respective mounting plates. The first and second slide plates may be configured as housings for the respective drive chains, the drive chains being configured further from the faces of the respective first and second side plates than a depth of the respective drive pins in the drive tracks. The drive pins may each be coupled to a link of the drive chain. The drive pins may be respectively configured with a recess configured to accept a boss extending from a corresponding link of the drive chain. The system may further include a first transmission chain provided to the first side plate and configured to transmit rotational power from the motor to the drive chain of the first side plate. The system may further include a second transmission chain provided to the first side plate, a third transmission chain provided to the second side plate, and a rotational shaft configured with a first end coupled to the first side plate, and a second end coupled to the second side plate, wherein the second transmission chain may be configured to transmit rotational power from the drive chain of the first side plate to the first end of the rotational shaft through the second transmission chain, and the third transmission chain may be configured to transmit rotational power from the second end of the rotational shaft to the drive chain of the second side plate. The system may further include a second transmission chain provided to the second side plate, and a rotational shaft configured with a first end coupled to the motor, and a second end coupled to the second side plate, wherein the motor may be configured to transmit rotational power from a first end of the motor to the first transmission chain, and to transmit rotational power from a second end of the motor to the rotational shaft so as to transmit rotational power to the drive chain of the second side plate through the second transmission chain. The system may further include a user interface to control rotation of the shelf members along the drive tracks. The user interface may include a plurality of buttons mounted near a front of the cabinet, and the buttons may be configured such that each of the shelf members is associated with a particular button, and actuation of the particular button may cause the associated shelf member to be brought to a predetermined access position. The motor may be configured proximate a back corner of the first side plate, and arranged so as to not interfere with movement of the shelf members. The system of shelf members may be at least partially closed by two end surfaces and a back surface to prevent items placed on the shelf members from falling out of the shelf members. The system may further include a lip arranged so as to extend up from a front edge of each of the shelf members.

Various example embodiments of the present general inventive concept may provide a revolving shelf system for a cabinet, the system including first and second side plates configured to be mounted on opposite side walls of a cabinet, a drive track configured on a face of each of the first and second side plates, a plurality of guide tracks configured on the face of each of the first and second side plates, a plurality of first and second mounting plates configured to be mounted on respective first and second ends of a plurality of shelf members, a drive pin arranged on each of the first and second mounting plates, and configured to extend respectively into each of the drive tracks, a plurality of guide pins arranged on each of the first and second mounting plates, and configured to extend respectively into corresponding ones of the guide tracks, a drive chain arranged in each of the first and second side plates to respectively drive the drive pins; and a motor configured to transmit a driving power to each of the drive chains, wherein the system is configured as a kit to be installed in a cabinet with the mounting plates connected to separately provided shelf members cut to an operable length; and wherein the shelf members with the mounting plates attached thereto are configured to move with a rotation motion of the drive chains, the drive pins and guide pins remaining extended into the respective drive pin tracks and guide pin tracks at any position of the shelf members.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A revolving shelf system for a cabinet, the system comprising:
   first and second side plates configured to be mounted on opposite side walls of a cabinet;
   a drive track configured on a face of each of the first and second side plates;
   a plurality of guide tracks configured on the face of each of the first and second side plates;
   a plurality of shelf members each having first and second ends;
   a drive pin arranged on each of the first and second ends of the shelf members, and configured to extend respectively into each of the drive tracks;
   a plurality of guide pins arranged on each of the first and second ends of the shelf members, and configured to extend respectively into corresponding ones of the guide tracks;
   a drive chain arranged in each of the first and second side plates to respectively drive the drive pins;
   a motor configured to transmit a driving power to each of the drive chains;
   a first transmission chain provided to the first side plate and configured to transmit rotational power from the motor to the drive chain of the first side plate;
   a second transmission chain provided to the second side plate; and
   a rotational shaft configured with a first end coupled to the motor, and a second end coupled to the second side plate;
   wherein the motor is configured to transmit rotational power from a first end of the motor to the first transmission chain, and to transmit rotational power from a second end of the motor to the rotational shaft so as to transmit rotational power to the drive chain of the second side plate through the second transmission chain, and
   wherein the shelf members are configured to move with a rotation motion of the drive chains, the drive pins and guide pins remaining extended into the respective drive pin tracks and guide pin tracks at any position of the shelf members.

2. The system of claim 1, wherein the shelf members are configured to remain in a horizontal position during movement of the drive chains.

3. The system of claim 2, wherein the guide pins maintain a constant orientation about the corresponding drive pin at each end of the shelf members during movement of the drive chains.

4. The system of claim 1, wherein the guide tracks are configured such that each guide pin has a same rotational path as the proximate drive pin.

5. The system of claim 4, wherein the guide tracks are configured such that at least a portion of a rotational path of each of the guide pins overlap with a rotational path of one or more of the other guide pins.

6. The system of claim 1, wherein the drive tracks and the guide tracks are configured as grooves that extend back from the respective faces of the first and second side plates.

7. The system of claim 6, wherein the drive tracks are configured to be deeper than the guide tracks.

8. The system of claim 1, further comprising a mounting plate provided at each of the first and second ends of the shelf members, wherein the drive pins and guide pins extend from the respective mounting plates.

9. The system of claim 1, wherein the first and second slide plates are configured as housings for the respective drive chains, the drive chains being configured further from the faces of the respective first and second side plates than a depth of the respective drive pins in the drive tracks.

10. The system of claim 9, wherein the drive pins are each coupled to a link of the drive chain.

11. The system of claim 10, wherein the drive pins are respectively configured with a recess configured to accept a boss extending from a corresponding link of the drive chain.

12. The system of claim 1, further comprising a user interface to control rotation of the shelf members along the drive tracks.

13. The system of claim 12, wherein the user interface comprises a plurality of buttons mounted near a front of the cabinet, the buttons configured such that each of the shelf members is associated with a particular button, and wherein actuation of the particular button causes the associated shelf member to be brought to a predetermined access position.

14. The system of claim 1, wherein the motor is configured proximate a back corner of the first side plate, and arranged so as to not interfere with movement of the shelf members.

15. The system of claim 1, wherein the shelf members are at least partially closed by two end surfaces and a back surface to prevent items placed on the shelf members from falling out of the shelf members.

16. The system of claim 15, further comprising a lip arranged so as to extend up from a front edge of each of the shelf members.

17. A revolving shelf system for a cabinet, the system comprising:
    first and second side plates configured to be mounted on opposite side walls of a cabinet;
    a drive track configured on a face of each of the first and second side plates;
    a plurality of guide tracks configured on the face of each of the first and second side plates;
    a plurality of shelf members each having first and second ends;
    a drive pin arranged on each of the first and second ends of the shelf members, and configured to extend respectively into each of the drive tracks;
    a plurality of guide pins arranged on each of the first and second ends of the shelf members, and configured to extend respectively into corresponding ones of the guide tracks;
    a drive chain arranged in each of the first and second side plates to respectively drive the drive pins;
    a motor configured to transmit a driving power to each of the drive chains;
    a first transmission chain provided to the first side plate and configured to transmit rotational power from the motor to the drive chain of the first side plate;
    a second transmission chain provided to the first side plate;
    a third transmission chain provided to the second side plate; and
    a rotational shaft configured with a first end coupled to the first side plate, and a second end coupled to the second side plate;
    wherein the second transmission chain is configured to transmit rotational power from the drive chain of the first side plate to the first end of the rotational shaft through the second transmission chain,
    wherein the third transmission chain is configured to transmit rotational power from the second end of the rotational shaft to the drive chain of the second side plate, and
    wherein the shelf members are configured to move with a rotation motion of the drive chains, the drive pins and guide pins remaining extended into the respective drive pin tracks and guide pin tracks at any position of the shelf members.

* * * * *